(No Model.)   3 Sheets—Sheet 1.

F. A. BROWNELL.
PHOTOGRAPHIC CAMERA.

No. 575,208.                     Patented Jan. 12, 1897.

Witnesses:
Thomas Durant
A. M. Kelly

Inventor,
Frank A. Brownell
by Frederick F. Church
his atty.

THE NORRIS PETERS CO., PHOTO-LITHO., WASHINGTON, D. C.

(No Model.) 3 Sheets—Sheet 2.

F. A. BROWNELL.
PHOTOGRAPHIC CAMERA.

No. 575,208. Patented Jan. 12, 1897.

Witnesses:
Thomas Durant
A. M. Kelly

Inventor,
Frank A. Brownell
by Frederick F. Church
his atty.

(No Model.)   3 Sheets—Sheet 3.

F. A. BROWNELL.
PHOTOGRAPHIC CAMERA.

No. 575,208.   Patented Jan. 12, 1897.

Witnesses:
Thomas Durant
A. M. Kelly

Inventor,
Frank A. Brownell
by Frederick F. Church
his atty

UNITED STATES PATENT OFFICE.

FRANK A. BROWNELL, OF ROCHESTER, NEW YORK, ASSIGNOR TO THE EASTMAN KODAK COMPANY, OF SAME PLACE.

PHOTOGRAPHIC CAMERA.

SPECIFICATION forming part of Letters Patent No. 575,208, dated January 12, 1897.

Application filed June 27, 1896. Serial No. 597,221. (No model.)

*To all whom it may concern:*

Be it known that I, FRANK A. BROWNELL, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention has for its object to improve the construction and operation of photographic cameras particularly adapted for carrying spools of film, and which is also arranged to receive a holder carrying cut sheets of film or plates, although some portions of the invention are applicable to other forms of cameras; and it consists in certain improvements in construction and combinations of parts, all as will be hereinafter fully described, and the novel features pointed out in the claims at the end of this specification.

Figure 1:
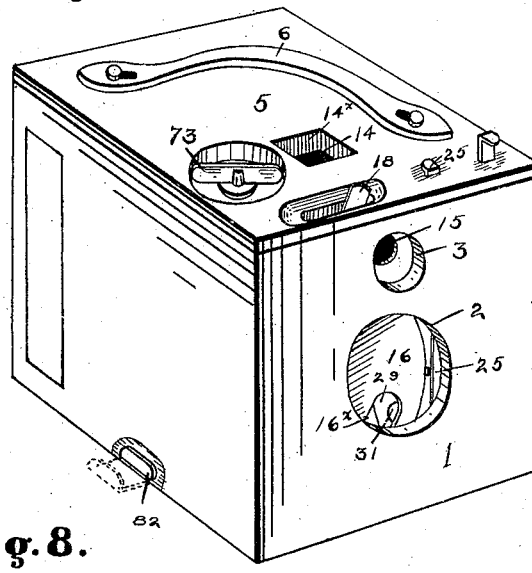
Figure 9:
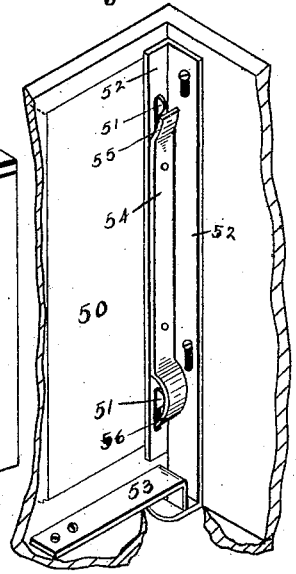
Figure 8:
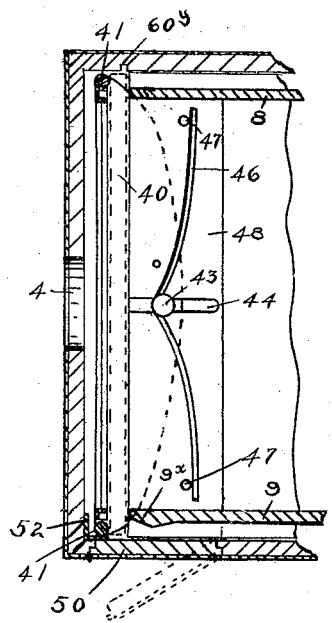
Figure 2:
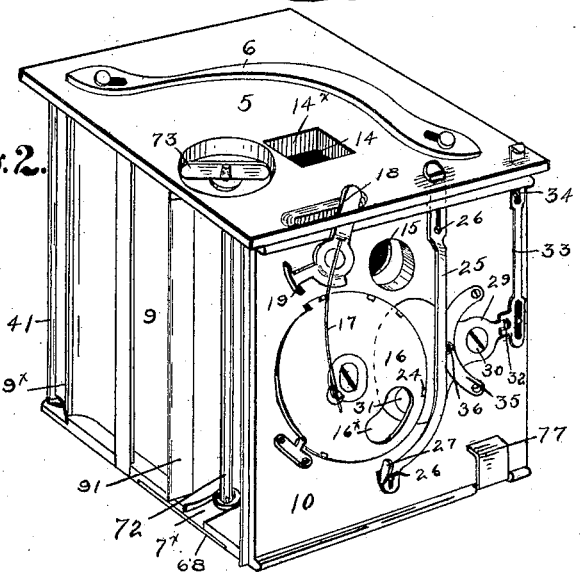
Figure 3:
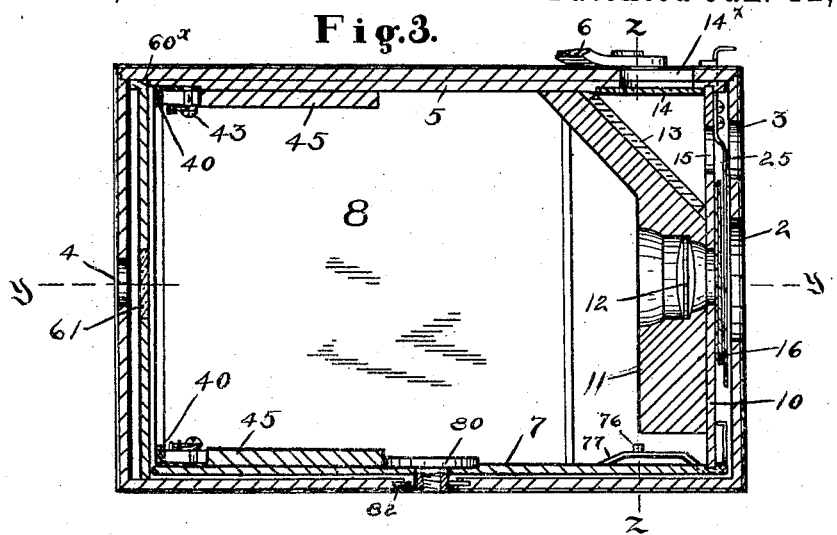
Figure 4:
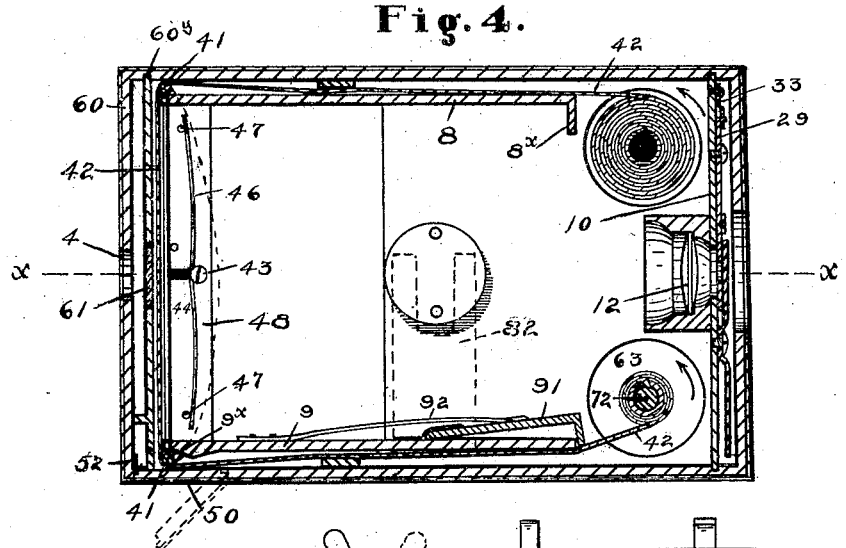
Figure 5:
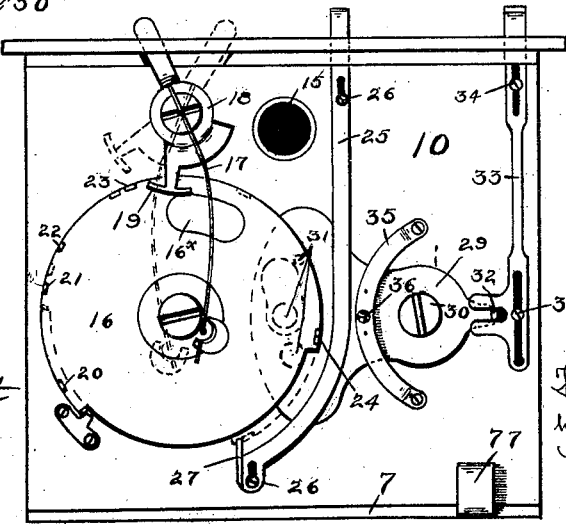
Figure 6:
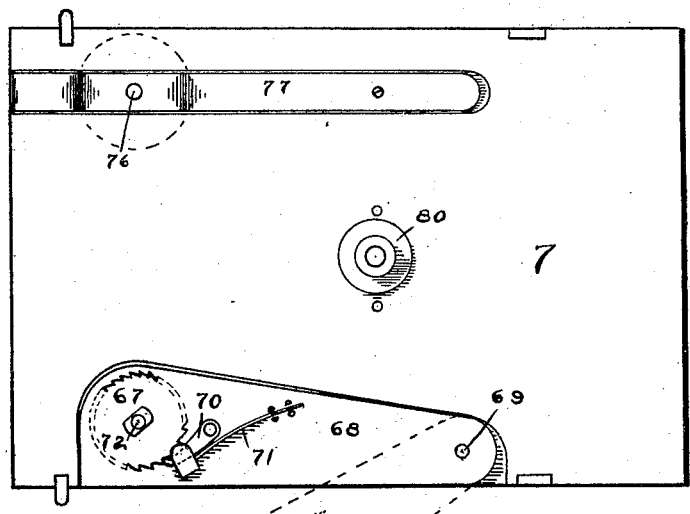
Figure 7:
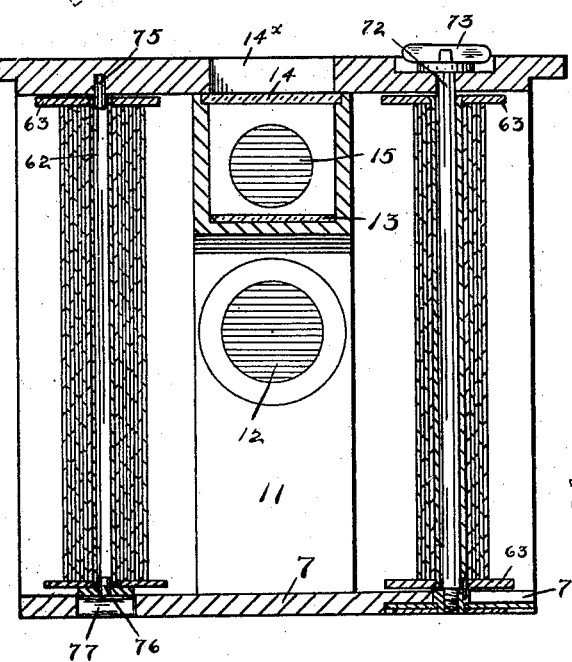
Figure 10:
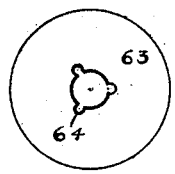
Figure 11:
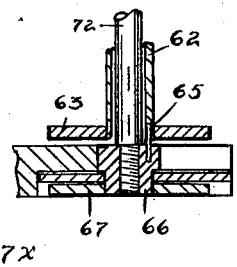

In the drawings, Figure 1 is a perspective view of a camera constructed in accordance with my invention; Fig. 2, a similar view of the removable frame carrying the operating parts; Fig. 3, a longitudinal vertical section on the line $x\ x$ of Fig. 4; Fig. 4, a horizontal section on the line $y\ y$ of Fig. 3; Fig. 5, a front view of the removable frame, showing the construction and operation of the time-stop for the shutter and the shutter itself; Fig. 6, a bottom plan view of the removable frame carrying the operating parts; Fig. 7, a vertical sectional view on the line $z\ z$ of Fig. 3; Fig. 8, a horizontal sectional view of the rear part, showing a plate-holder inserted in the camera; Figs. 9, 10, and 11, detail views. Similar reference-numerals in the several figures indicate similar parts.

1 indicates the camera-casing, provided with the usual apertures 2 and 3 for the main and finder lenses, respectively, having at its rear an opening 4 for inspecting the designating-marks on the back of the film or the covering thereof as it is wound from one spool to the other.

The removable frame carrying the operating parts of the camera and adapted to be removed from the casing embodies a top portion 5, having a handle 6 thereon, the bottom board 7, the sides 8 and 9, and the front board 10.

11 indicates the lens-post, having the main lens 12 thereon, and at its upper portion the finder-chamber, provided with a mirror 13, ground glass 14, and at the front a lens 15, in line with the aperture 3 in the front of the casing.

$14^\times$ indicates an opening in the top through which the ground glass of the finder may be observed.

Upon the front board 10 is pivoted a shutter 16, which may be of any suitable construction, but in the present instance consists of a circular oscillatory plate adapted to be moved in either direction by a reversible spring 17, attached to an oscillatory arm 18 and connected with the shutter, so that as the arm 18 is moved to one side or the other the spring will be placed under tension to throw the shutter, and the shutter may be retained against the spring by means of a segmental projection 19 on the arm 18, or other means may be employed for the purpose. The arm 18 is held in the position to which it may be moved by the friction between it and the board 10 or otherwise. The shutter 16 is provided with stops or projecting lugs 20, 21, 22, 23, and 24 at or near its periphery, with which the projection 19 on the arm 18 is adapted to coöperate, so that as the arm is oscillated in one direction the spring will be placed under tension and the shutter retained by the projection 19 engaging the lug 20 or 23 until the proper tension is reached, when the projection 19 will pass by the lug and it will be released and the shutter thrown so that the aperture $16^\times$ therein will pass the lens-opening and make an instantaneous exposure.

In order that the shutter may be arrested for a time-exposure, I provide a movable time-stop in the form of a sliding rod or plate 25, guided by suitable screws or pins 26, entering slots therein, having at its lower end a lug or projection 27, coöperating with the stop 24 on the shutter, while the upper end of said plate 25 extends out at the top of the camera in position to be manipulated for the purpose of making a time-exposure when desired. This exposed end of the rod or plate serves as an indicator, so that the operator will know that when the plate is drawn upward the shutter is arranged for a time-exposure. The normal position of this plate is shown in Fig. 2 when the shutter is adapted for instantaneous exposures; but when drawn up, as in Fig. 5, the end 27 will project in the path of the stop 24 on the shutter, and when the latter is moved by its spring said end will arrest it with the aperture 16$^x$ in line with the lens-opening, the only operations required being to draw up the plate 25 and move the oscillating arm 18 from the position shown in full lines in Fig. 5 to that shown in dotted lines.

29 indicates a diaphragm-plate pivoted at 30 to the front board 10, having near one of its ends a series of apertures 31, as shown in dotted lines in Fig. 5, the opposite end having a projection 32, which is engaged by a yoke formed upon the end of a sliding rod or plate 33, guided by suitable pins or screws 34, projecting through slots therein and having its upper end projecting through the top of the camera.

35 indicates a segmental spring-plate secured to the front board 10 and having a projection 36 on its under side adapted to engage with suitable depressions in the diaphragm-plate 29, so as to hold one or the other of the apertures 31 in line with the lens-opening by friction, but not preventing the manipulation of said plate by the movement of the plate or rod 33. The apertures in the diaphragm 29 are so arranged that when the rod 33 is pushed in the largest opening is in line with the lens, and, as the time-stop is out of operative position when moved in, the operator knows he can make ordinary instantaneous exposures when the camera-top is clear of projecting parts.

At the rear of the exposing-chamber in the removable frame composed of the top 5, bottom 7, and sides 8 and 9 is a frame 40, preferably composed of sheet metal, with the comparatively wide top and bottom plates 48, and having at opposite sides small vertically-extending loose rollers 41, journaled therein and serving as guides for the film 42 as it passes from the delivery-spool located at the front of the camera, as will be described, to the spool serving as the winding-reel, also at the front of the camera on the opposite side of the lens. This frame 40 is provided with inwardly-projecting pins 43 on the top and bottom plates 48, operating in slots 44, formed in suitable pieces 45, attached to the top 5 and bottom 7 of the removable frame, and 46 indicates springs engaging the pins 43 and having their ends against pins or stops 47, the tendency of these springs being to hold the frame 40 against the end of the carrying-frame and permit it to be moved outward, as shown in full lines in Fig. 8, against the tension of the springs, for the insertion of the plate-holder 49 between said frame 40 and the rear of the carrying-frame. The rear faces of the rollers 41 are normally in the plane of the focus of the lens, so that the film passing over them will be at the proper focus, and when said frame 40 is moved back after the introduction of the plate-holder the springs 46 will hold the plate-holder in proper position.

While I prefer to employ the movable rollers 41 at the sides of the frame 40, this is not absolutely necessary, as the film could be moved over the smooth or rounded edge of the frame or the rollers could be made stationary.

The rear end of the side board 9 is provided with an inclined end 9$^x$, as in Figs. 4 and 8, to permit the introduction of the edge of the plate-holder to move the frame 40 backward, and a door 50 is provided in the outer casing 1 for permitting the introduction of the plate-holder. This door may be retained by any suitable form of catch, but I prefer to provide it with catch-projections 51, arranged to coöperate with the edges of suitable apertures formed in one side of the angular plate 52, arranged in the corner of the casing, as shown particularly in Fig. 9, and vertically movable by means of a spring 53, engaging its laterally-bent lower end, which end is accessible from the exterior of the casing, but is preferably covered by the leather or other covering for the casing.

54 is a plate secured to the plate 52 and having inclined portions 55 and 56, operating when the plate 52 is moved upward to engage the projections 51 and throw the door 50 open, as shown in dotted lines in Fig. 8.

When the camera is used for film in continuous lengths, the frame 41 is in the position shown in Fig. 4, close against the back of the frame, and a removable filling piece or frame 60 is arranged back of the roller-frame to fill up the space which at times is occupied by the plate-holder, and in this frame is a piece of ruby glass 61, through which the numbers on the back of the film or film-covering can be viewed without permitting the passage of actinic light to fog the film. One edge of the frame 60 is arranged to enter a groove 60$^x$ in the casing, and a rearwardly-extending flange 60$^y$ is located at the rear side, these arrangements preventing the entrance of light through the aperture 4. This frame 60 serves the further function of preventing the opening of the door 50 when the camera is used with rolls of film, as its lower edge rests upon the spring 53, preventing the operation of the plate 52, and it is held in place by the projecting edge of the top 5 of the removable frame.

The spools for containing the film both before and after exposure are similar and interchangeable and are composed of the tubular bodies 62, having flanges 63 at the ends and at one end provided with suitable apertures 64, as shown particularly in Figs. 10 and 11, for the reception of pins 65 on the arbor 66, formed upon or attached to a ratchet-wheel 67 for locking the spool to the ratchet-wheel, the latter preventing backward movement of the spool serving for the moment as the winding-reel. This ratchet-wheel 67 is journaled in a plate 68, pivoted at 69 to the bottom board 7 of the removable frame, and upon it is provided a pawl 70, operated by a spring 71, as shown in Fig. 6. The bottom board 7 is provided with a slot or recess 7ˣ, extending to the edge for the passage of the arbor 66 as the plate 68 is swung to the position shown in dotted lines in Fig. 6 for the engagement of the end of the winding-spool, said spool being held, when the plate 68 is swung in, by the operating spindle or rod 72, having a handle 73 at its upper end, while its lower end is threaded and enters the arbor 66. By this means the spool is secured in position and may be turned in one direction to wind the film forward, backward movement being prevented by the pawl coöperating with the ratchet-wheel 67.

The supply-spool containing unexposed film is secured in position in the frame by means of a pin or projection 75, entering the upper end of the spool, while the lower end is held by a corresponding projection 76 on a spring 77, projecting up through a slot in the bottom board 7 and offering sufficient frictional resistance to the rotation of the spool to properly tension the film as it is drawn forward, and the end of the spring is extended in front of the board 10, so that the empty spool may be readily removed from the camera by pressing down on the spring 77 and disengaging the projection 76.

The forward end of the side board 8 is provided with a slight inwardly-projecting extension 8ˣ (see Fig. 4) to prevent light which might be radiated from the interior of the camera during exposure from striking the face of the film, and on the side board 9 is provided a movable flap 91, pivoted at its rear end and moved outward by a spring 92, as shown in Fig. 4. The extreme end of this flap 91 is covered with velvet or similar material, so as not to injure the film passing beneath it. Its principal function is, when moved outward by its spring 92, to coöperate with the outer casing 1 and prevent the passage of light to the forward portion of the camera between the plate and the casing when the rear door 50 is opened for the admission or removal of a plate-holder, although the velvet surface of said flap will serve to remove from the face of the film any dust or foreign substances.

The removable frame carrying the operating parts of the camera is provided with a stud or projection 80 in its under side having a head on the extreme end, and adapted to enter a recess formed in the bottom of the casing and to become engaged by a laterally-sliding catch-plate 82, serving to retain the parts together when pushed in. The lower end of this stud 80 is provided with a threaded aperture for the entrance of a screw, by means of which the camera may be attached to a tripod head or other support.

The manner of using and manipulating cameras of this description is so well known that a specific description is not necessary.

I claim as my invention—

1. The combination with a photographic camera, having devices for holding film, of a rearwardly-movable open frame arranged at the rear end of the exposing-chamber and between which and said rear end a plate-holder may be inserted, said frame having rollers at opposite sides, over which the film passes, substantially as described.

2. The combination with a photographic camera having devices for holding film, of the rearwardly-movable open frame at the rear of the exposing-chamber over which the film passes, and between which and the camera back a plate-holder may be inserted, substantially as described.

3. The combination with a photographic camera having devices for holding film, of the rearwardly-movable open frame at the rear of the exposing-chamber over which the film passes and between which and the rear of the exposing-chamber a plate-holder may be inserted, and springs for holding said open frame against the end of the exposing-chamber, substantially as described.

4. The combination with a photographic camera having the door in the side at the rear, and devices for holding film, of the rearwardly-movable open frame at the rear of the exposing-chamber over which the film passes and arranged adjacent to said door and between which frame and the back of the exposing-chamber a plate-holder may be inserted, substantially as described.

5. The combination with a photographic camera having devices for holding film near the forward portion and film-passages at the sides for the film, of a movable frame at the rear of the exposing-chamber forming a guide for the film, a door in the camera-casing adjacent to the movable frame, and an automatic light-excluding flap arranged in one of the film-passages, substantially as described.

6. The combination with a photographic camera having devices for holding film near the forward portion and film-passages at the sides, of the spring-operated flap engaging the film and arranged to close the film-passage when the film is removed, substantially as described.

7. The combination with a photographic camera having devices for holding film, of the spring-pressed movable frame at the rear of the exposing-chamber serving as a guide for the film and having the plate or ledge at the bottom, whereby a plate-holder may be inserted between the frame and the rear of the exposing-chamber, substantially as described.

8. In a photographic camera, the combination with the casing having the door in the side, of the removable frame embodying the exposing-chamber having the lens and film-carrying devices thereon, and the rearwardly-movable spring-pressed frame at the rear of the exposing-chamber over which the film passes, substantially as described.

9. In a photographic camera, the combination with the casing, of the removable frame having the exposing-chamber, and the lens, the spring-arm at one side of the exposing-chamber having the stud for engaging one end of the film-spool, the stud for engaging the other end of the spool, and film holding and winding devices on the other side of the exposing-chamber embodying an arbor for engaging a film-spool and a ratchet-wheel and coöperating pawl, substantially as described.

10. In a photographic camera, the combination with the casing and the removable frame therein embodying film-winding devices, of the holder for the film-supply spool, consisting of the spring 77 having the projection 76, and the stud 75 in the frame, substantially as described.

11. In a photographic camera, the combination with a lens, a movable shutter having an aperture and a motor for operating it, both arranged inside the casing of the camera, of a time-stop for arresting the shutter with the aperture in line with the lens-opening, having an operating part projecting from the camera when operative, a movable diaphragm having a series of apertures, and a rod for operating it projecting from the casing when the largest aperture is out of line with the lens, whereby the operating parts of the diaphragm and time stops will serve as indicators, substantially as described.

12. In a photographic camera, the combination with the casing and the removable frame having the exposing-chamber, and film holding and feeding devices thereon, of the swinging plate 68 having the ratchet wheel and pawl thereon, and the removable spindle passing through the casing and spool and engaging the ratchet-wheel so as to turn it, substantially as described.

13. The combination with the camera-casing, an exposing-chamber therein, and a film-support at the rear end of the said chamber, of film holding and winding devices located within the casing on opposite sides of the exposing-chamber and forward of the film-support, and a door in the casing adjacent to the film-support, whereby a plate-holder may be applied to the end of the exposing-chamber without displacing the film-winding devices, substantially as described.

14. In a camera, the combination with the film holding and winding devices, and a support for film at the rear portion and within the camera-casing, and a movable filling-frame in rear of the film-support, of a door in the casing adjacent to the film-support, locking devices for the door, and connections between the locking devices and the filling-frame for holding the door closed when the frame is in position, substantially as described.

15. In a camera, the combination with the film holding and winding devices and a support for film at the rear portion located within the camera-casing, and a movable filling-frame in rear of the film-support, of a door in the casing adjacent to the film-support, a movable plate, as 52, engaging the door, and the spring 53 engaged by the filling-frame when in position, substantially as described.

16. In a camera, the combination with the casing having the door at the rear, locking devices therefor, and the removable frame 60 coöperating with the locking devices for holding the door closed, of the removable frame adapted to be inserted in the casing having film-holding devices thereon and a film-support located in line with the door in the casing when the removable frame is in position, substantially as described.

17. In a camera for holding roll-film or plates, the combination with a casing and film holding and winding devices, and a film-support therein, of a door adjacent to the film-support, locking devices for said door capable of being released from the exterior of the casing, and a movable member within the casing for preventing the operation of the locking devices when roll-film is being used in the camera, substantially as described.

18. In a camera, the combination with the casing having the door in its rear portion and securing devices therefor, the removable frame 60 coöperating with the locking devices, of the removable frame having film-holding devices, the exposing-chamber, and the spring-operated frame at the rear of the exposing-chamber and adjacent to the door in the casing, substantially as described.

19. In a camera for holding roll-film or plates, the combination with the camera-casing, the film holding and winding devices and a film-support, of the door in the casing adjacent to the film-support having the catches, the movable plate engaging the catches, the inclined projections on the plate for engaging the catches and forcing the door open, and locking devices within the casing for preventing the operation of the movable plate, substantially as described.

20. In a camera for holding roll-film or plates, the combination with the camera-casing, the film holding and winding devices and a film-support, of the door in the casing adjacent to the film-support having the catches, the movable plate engaging the catches and forcing the door open, the spring for actuating the plate in one direction and locking devices for preventing the operation of the movable plate, substantially as described.

FRANK A. BROWNELL.

Witnesses:
F. F. CHURCH,
THOMAS DURANT.